Patented Dec. 26, 1933

1,940,987

UNITED STATES PATENT OFFICE

1,940,987

PROCESS FOR THE PREPARATION OF ORGANIC ACIDS

John C. Woodhouse, Wilmington, Del., assignor to E. I. du Pont de Nemours & Company, Wilmington, Del., a corporation of Delaware No Drawing. Application April 23, 1931
Serial No. 532,275

10 Claims. (Cl. 260—116)

This invention relates to a process for the formation of organic compounds and particularly to the preparation of monocarboxylic acids by the interaction of aliphatic alcohols and carbon monoxide in the presence of a catalyst.

It is known that organic acids and esters can be prepared by the interaction, in the vapor or liquid phase, of organic compounds with the oxides of carbon. For example, it has been shown that the condensation of methyl alcohol with carbon monoxide, in the presence of a suitable catalyst, will produce acetic acid and methyl acetate in proportions governed by the particular operating conditions. Acids have likewise been formed from methane and carbon dioxide, from carbon monoxide and water, and from ethers and carbon monoxide.

In the actual operation of the above processes it is difficult, if not impossible, to so control the reaction that no compound, other than the organic acid sought, is produced. For instance, when synthesizing acetic acid by the passage of carbon monoxide and methanol over a catalyst, there may be formed in conjunction with the acetic acid, dimethyl ether, methyl formate, and perhaps some methyl acetate with generally some carbon dioxide and methane. Consequently, the cost of producing the acid is greatly increased over a process involving no by-product formation and, furthermore, the by-products of the reaction, while of some value, are undesirable as they not only lower the yield of the acid produced but also require larger equipment cost for same output of acid.

An object of the present invention is to provide a process for the preparation of organic acids in which the formation of by-products is inhibited. Another object of the invention is to provide a process for the recirculation of the by-products formed during the reaction in order to suppress their further formation. A still further object of the invention is to provide a process for the preparation of organic acids in which the organic acid in the gaseous products is fractionally condensed therefrom and the other compounds present recirculated through the process.

Other objects and advantages of the invention will be apparent as it is better understood by reference to the following specification in which its details and preferred embodiments are described.

In carrying out gaseous reactions for the preparation of organic acids from alcohols and carbon monoxide in which the formation of by-products is high, I have found that their formation can be inhibited and, in some cases, substantially eliminated by employing a process utilizing recirculation,—the acid formed being removed from the system.

By this process, it is possible to carry out the synthesis of organic acids, such as acetic acid, propionic acid, butyric acid, etc., from the next lower alcohol of the series, in conjunction with carbon monoxide, more efficiently since there is larger proportion of the raw materials converted into the acid, and a relatively smaller amount of by-products to be disposed of.

As stated above, esters, ethers, hydrocarbons, and carbon oxides are generally formed together with the acetic acid during the synthesis of the latter. Similar by-products, of course, are formed when the higher acids are being prepared. In the actual operation of my invention, therefore, it is preferable to remove from the gases coming from the reaction only the acid formed and to recirculate to the reaction zone the by-products and unconverted gases. Reactions of this type are usually operated at, say, 25 to 900 atmospheres and under these conditions all of the products other than the permanent gases, carbon monoxide, hydrogen, etc., are liquid at ordinary temperatures. In separating the organic acid, therefore, from the gaseous mixture fractional condensation may be utilized to effect the removal of substantially all the acid and water from the mixture. Other means may be employed to realize this result although fractional condensation under elevated or atmospheric pressure is well adapted for this purpose.

Subsequent to the removal of the acid and water, the remaining gaseous mixture is circulated again through the conversion chamber after adding to it the necessary raw materials. Since methane and other inert gases, such as carbon dioxide, may increase in concentration in the circulating gas, it is accordingly necessary to periodically or continuously withdraw from the circulatory system an appropriate amount of the residual gases, preferably after separation of the acid formed, in order that the methane and/or carbon dioxide may be kept down to a limiting concentration. By suitably adjusting the amount of gases so withdrawn, and regulating the proportions of alcohol and carbon monoxide added to the reaction, the limiting proportion of these inerts to the reactants can readily be maintained.

Upon starting up a circulatory process of this type it will usually be found that the concentration of the inert gases increases continuously. As a result the partial pressure of the reactants decreases and a lower yield of the acid is eventually obtained. It is of advantage, therefore, to bleed off a portion of the gaseous mixture at a point between the fractional condensation step and the point at which the gaseous mixture is reintroduced into the reaction chamber. The bled-off gases are subjected to a scrubbing and/or fractional condensation operation which separates the mixture into two fractions: one fraction containing compounds which react with carbon monoxide preferably in the presence of water to give acetic acid are returned to the reaction chamber; the other fraction is vented. By this step the concentration of the inert gases, or any other constituent, the concentration of which it may be desired to control, may be maintained.

Although the invention is susceptible of embodiments in many forms which may differ as to conditions of operation as well as to materials and apparatus employed, the following example will serve to illustrate one method of applying the invention to the synthesis of acetic acid and its esters.

The apparatus consists of a compressor, of which the parts contacting with the gases to react are constructed of materials which are not readily attacked by the gases employed, the compressor being adapted to bring the gases to the pressure at which the reaction is effected,—a reaction apparatus in which is disposed a catalyst suitable for the synthesis of acetic acid, a condenser for fractional condensation, a receiver for collecting the condensed acid of the reaction, a second condenser for the purging operation, and a regulating pump. The reaction apparatus, condenser, receiver, second condenser, and circulating pump are connected in a series circuit in the order named, with a by-pass around the second condenser, and through this system is circulated continuously a body of a gaseous medium, such as carbon monoxide, under a pressure of 700 atmospheres. The catalyst, which may consist, for example, of silico-tungstic acid, is heated initially to reaction temperature by electrical means, and it having attained that temperature, a gaseous mixture containing approximately equal molal proportions of carbon monoxide, and methanol containing approximately 10% water, if desired, compressed to 700 atmospheres, is gradually admitted to the circulatory system where it is passed at a temperature of approximately 350° C. over the acetic acid-forming catalyst disposed in the reaction apparatus. The carbon monoxide and methanol combine to form acetic acid and by-products, the former and water are condensed by fractional condensation in the condenser and collected in the receiver. The greater proportion of the residual gases by-pass the second condenser and are returned by the circulatory pump to the reaction apparatus, where, together with additional proportions of a suitable mixture of methanol, water, and carbon monoxide, they undergo further reaction to produce the acetic acid. Provision is made, by means of the second fractional condenser, for continuously withdrawing residual gas from the system, stripping therefrom compounds other than methane and carbon monoxide, capable of yielding acetic acid, and returning them to the system. When the reaction is under way, the quantity of carbon monoxide and methanol added to the system are regulated, at all times, so that the carbon monoxide and methanol concentration contacting with the catalyst is substantially uniform.

After the catalyst has been initially heated to reaction temperature, the electrical heating is in part or wholly dispensed with, as may be required, and the temperature of the reaction may be thereafter controlled for the most part by regulating the concentration of the circulating gas employed.

From a consideration of the above disclosure, it will be realized that various reactants may be catalytically converted into oganic compounds containing a negative radical of an aliphatic acid, and all such reactions will come within the scope of the invention if the formation of the by-products of the reaction be inhibited by the recirculation process as hereinbefore described.

I claim:

1. A process for the synthesis of organic acids which comprises passing carbon monoxide and an aliphatic alcohol into a circulating gaseous medium containing a high concentration of by-products of the reaction, circulating the resulting gaseous mixture over a heated catalyst adapted for the synthesis, removing the organic acid formed and recirculating the separated by-products over the catalyst, while maintaining a substantially uniform concentration of the reacting gaseous mixture.

2. A process for the synthesis of organic acids which comprises passing carbon monoxide and an aliphatic alcohol into a circulating gaseous medium containing a high concentration of by-products of the reaction, circulating the resulting gaseous mixture over a heated catalyst adapted for the synthesis, removing the organic acid formed from the circulating gases, while maintaining a high concentration of the by-products of the reaction in the gases passing over the catalyst.

3. A process for the synthesis of organic acids which comprises passing carbon monoxide and an aliphatic alcohol into a circulating gaseous medium containing a high concentration of by-products of the reaction, circulating the resulting gaseous mixture over a heated catalyst adapted for the synthesis, removing the organic acid formed and water from the circulating gases, by a fractional condensation step in which only the acetic acid and water are substantially wholly removed, while maintaining a substantially uniform concentration of the reacting gaseous mixture.

4. A process for the synthesis of acetic acid which comprises continuously contacting with a heated catalyst a gaseous mixture of carbon monoxide and methanol containing a high concentration of by-products of the reaction, such as dimethyl ether, methyl formate, methane, etc., the acetic acid being substantially completely removed from the gases prior to their recirculation over the catalyst, while maintaining a substantially uniform concentration of the reacting gaseous mixture by continuous withdrawal of portions and replacement thereof by fresh carbon monoxide and alcohol.

5. A process for the synthesis of acetic acid which comprises passing a gaseous mixture of carbon monoxide and methanol into a circulating gaseous medium containing a high concentration of the by-products of the reaction, circulating the resulting gaseous mixture over a heated catalyst adapted for said synthesis, removing the acetic acid formed by fractional condensation and recirculating the separated by-products over the catalyst, while maintaining a substantially uniform concentration of inert gases during contact with the catalyst by separation of portions of the circulating mixture and replacement thereof with fresh mixtures of gases for the reaction.

6. In a process for the synthesis of organic acids the step which comprises passing carbon monoxide and an aliphatic alcohol into a circulating gaseous medium containing a high concentration of by-products of the reaction, circulating the resulting gaseous mixture over a heated catalyst adapted for the synthesis, removing the organic acid formed from the circulating gases, while maintaining a high concentration of the by-products of the reaction in the gases passing over the catalyst.

7. In a process for the synthesis of acetic acid the step which comprises continuously contacting with a heated catalyst a gaseous mixture of carbon monoxide and methanol containing a high concentration of by-products of the reaction, such as dimethyl ether, methyl formate, methane, etc., the acetic acid being substantially completely removed from the gases prior to their recirculation over the catalyst, while maintaining a substantially uniform concentration of the carbon monoxide and methanol by continuous withdrawal of portions of the gaseous mixture immediately subsequent to the removal therefrom of the acetic acid, and replacement of that portion of the gaseous mixture removed by fresh carbon monoxide and alcohol.

8. In a vapor phase circulatory process for the synthesis of organic acids, the method of controlling the relative quantities of acids and by-products produced, which consists in maintaining a high concentration of all the by-products of the reaction in the circulating gaseous mixture and removing the organic acid products therefrom, while maintaining a substantially uniform concentration of the reacting gases contained therein, by continuous withdrawal of portions and replacement thereof with the reactants.

9. In a vapor phase circulatory process for the preparation of aliphatic monocarboxylic acids by the interaction of aliphatic monohydroxy alcohols with carbon monoxide, the method of controlling the relative quantities of acid and by-products produced, which consists in maintaining a high concentration of all the by-products of the reaction in the circulatory gaseous mixture, and removing the organic acids therefrom, while maintaining a substantially uniform concentration of the reacting gases contained therein, by continuous withdrawal of portions and replacement thereof by fresh carbon monoxide and alcohols.

10. In a vapor phase circulatory process for the synthesis of acetic acid from methanol and carbon monoxide the method of controlling the relative quantities of acetic acid and by-products produced which consists in maintaining a high concentration of all the by-products of the reaction in the circulatory gaseous mixture, and removing the acetic acid therefrom while maintaining a substantially uniform concentration of carbon monoxide and methanol, by continuous withdrawal of portions and replacement thereof with carbon monoxide and methanol.

JOHN C. WOODHOUSE.